Aug. 25, 1942.    O. G. SALB ET AL    2,294,015
INSTRUMENT USEFUL IN THE ANALYSIS OF VIBRATIONS
IN ORGANIZED LIVING TISSUE
Filed July 17, 1939    3 Sheets-Sheet 1

Inventor
Oscar G. Salb
Ralph E. Sturm
By Williams, Bradbury,
McCaleb & Hinkle
Attys Patented Aug. 25, 1942

2,294,015

UNITED STATES PATENT OFFICE 2,294,015

INSTRUMENT USEFUL IN THE ANALYSIS OF VIBRATIONS IN ORGANIZED LIVING TISSUE

Oscar G. Salb, Indianapolis, Ind., and Ralph E. Sturm, Milton, Wis.

Application July 17, 1939, Serial No. 285,028

15 Claims. (Cl. 128—2.06)

Our invention relates to instruments useful in the analysis of vibrations in organized living tissues.

Although not limited to such field, the invention will be explained as embodied in apparatus particularly adapted for accurately and reliably detecting cardiac vibrations as an aid in diagnosing heart conditions.

By "cardiac vibrations," as that term is herein employed, we mean periodicity in movement of the anatomic components involved in any one or more phases of a heart cycle.

Many attempts have been made in the past to devise instruments for aiding aurally and visually the diagnosis of cardiac conditions. Heretofore, however, no wholly satisfactory diagnostic instrument has been available although the stethoscope and the electrocardiograph perform useful functions to that end and are being extensively used. Other instruments, using the principle of the stethoscope and of the electrocardiograph have been devised and some, within their limitations, have been found to be useful aids in diagnosis.

All such instruments, however, do have their limitations and, as we believe, leave unobservable, conditions which, if they could be detected and understood, would lead to a far greater knowledge of heart conditions,—particularly pathological conditions in incipient stages.

The stethoscope, as is well understood, is useful only in transmitting to the ear of the observer vibrations within the audible range. Because of this limitation and differences in aural perception, and also because of its susceptibility to disturbing phenomena inherent in the transmission of sound waves, particularly through or by means of air columns such as the stethoscope does employ, the shortcomings of this instrument are well recognized.

The electrocardiograph, which is based upon the idea of indicating differences of electrical potential produced by muscular activity, likewise has its limitations and, in heart diagnosis, is subject to extraneous disturbances which likewise, as is recognized, restrict the utility of this instrument as a diagnostic aid.

One of the objects of our invention is to provide an instrument that will make a visual indication (either immediately—e. g., on the viewing screen of a cathode ray tube—or subsequently by a sensitized strip) of vibrations of slight magnitude and of frequencies outside of, as well as within, the audible range and also indicate variations in vibration character which cannot be detected aurally.

Another object is to provide an instrument particularly adapted for use in heart diagnoses and which will not be subject to limitations of the kinds that curtail the scope of results obtainable from diagnostic instruments now in vogue.

A further object is the provision of means for faithfully translating vibrations from their source into visual indications.

Another object is to provide equipment for making a permanent record of vibration indications.

A further object is to provide an improved device or "pick-up" for faithfully reproducing vibrations.

Other objects and advantages will appear hereinafter.

An embodiment of the invention, particularly adapted for the simultaneous transient indications and making a permanent record of cardiac vibrations, is illustrated in the accompanying drawings, wherein.

In general, the preferred embodiment of the invention provides novel circuits by which the fundamental frequencies of the heart, along with the harmonics thereof, can be visually represented upon the screen of a cathode ray tube and, if desired, permanently recorded photographically.

A novel type of electrical pick-up is provided for detecting heart vibrations through the chest wall of a patient. These vibrations are translated into electrical waves, and the waves are amplified and applied to the deflecting plates of a cathode ray tube so that the different vibrations trace a wave representing the different peaks that occur during the cardiac cycle.

Through connection with the other deflecting plates of the cathode ray tube, a sweep or timing circuit controls the rate at which the cathode ray travels across the screen of the tube and gives a definite relation in time between the heart vibrations and the different portions of a complete heart cycle in which these vibrations occur. A synchronizing circuit is provided for controlling the operation of the sweep or timing circuit so that this latter circuit may begin to operate upon the occurrence of a vibration of predetermined amplitude such, for example, as the initial impulse of a heart beat.

This synchronizing circuit can be timed so as to allow operation of the sweep circuit in synchronism with a heart beat or in synchronism with a particular portion of a heart beat, if it is desired to examine only a portion of the cardiac cycle. In order to insure against operation of the synchronizing circuit before the peak of a predetermined vibration has been reached, a novel impulse circuit has been devised by means of which the synchronizing circuit can be placed in operation almost instantaneously upon the rise in voltage due to a particular heart vibration and kept from retripping due to other vibrations until the cycle is completed. An additional novel feature of the invention is the provision of a second cathode ray tube with photographic film and a camera so that when desired, a permanent record of the cardiac cycle vibrations can be obtained. Further, the invention contemplates the use of a novel type of electrical pick-up for detecting and accurately translating heart vibrations to the viewing screen of, or, if used, to the photographic film associated with, the cathode ray tube.

The present invention is based upon the discovery that vibrations of the heart, including the different valves therein, occur at frequencies some of which are well below the audible range. Heretofore, it was believed that the different sounds perceptible in the stethoscope represented the lowest frequencies of vibrations of the heart, but by the present invention it can be shown that vibrations far below the audible range—as low as a few cycles per second—do occur in the heart. The detection and analysis of these low-frequency vibrations may perform a very important function in the correct diagnosis of cardiac conditions. Generally speaking, the first heart "sound" in a complete cardiac cycle is that which is phonetically and usually represented as "lubb." It seems to be the consensus that this sound is produced by vibrations set up by the heart striking against the chest wall, augmented or modified perhaps by vibrations set up by the contraction of the ventricles and the closing of the auricular-ventricular valves in the beginning of systole. Authorities have stated that these vibrations in a stethoscope are of the order of 55 cycles per second.

The second heart sound which takes place at the beginning of diastole is due principally to the closing of the semi-lunar valves and in a stethoscope it is said to average about 62 cycles per second. This sound is conventionally represented phonetically as "dupp." Heretofore, it seems to have been impossible accurately to ascribe these sounds to any one portion of the heart and it is not agreed that the actual closing of the mitral and tricuspid valves has ever been heard. By the present invention it can be shown that vibrations wholly incapable of being heard on account of their low frequency, or low intensity, or due to the fact that they occur immediately after high intensity vibrations, are set up upon the occurrence of operations of components of the heart—such as its valves—during the cardiac cycle. While the human heart is not uniform in characteristics for different individuals, the present invention shows that frequencies of the order of 4 and 5 cycles per second may be set up during a complete heart cycle. Since these frequencies have not been previously discernible—because inaudible—and since they were apparently unknown prior to the time of the present invention, we believe a new method of diagnosis is made available by this invention, and the discovery of cardiac diseases or dysfunctions, even in their incipient forms and stages, will be possible.

Figure 1:
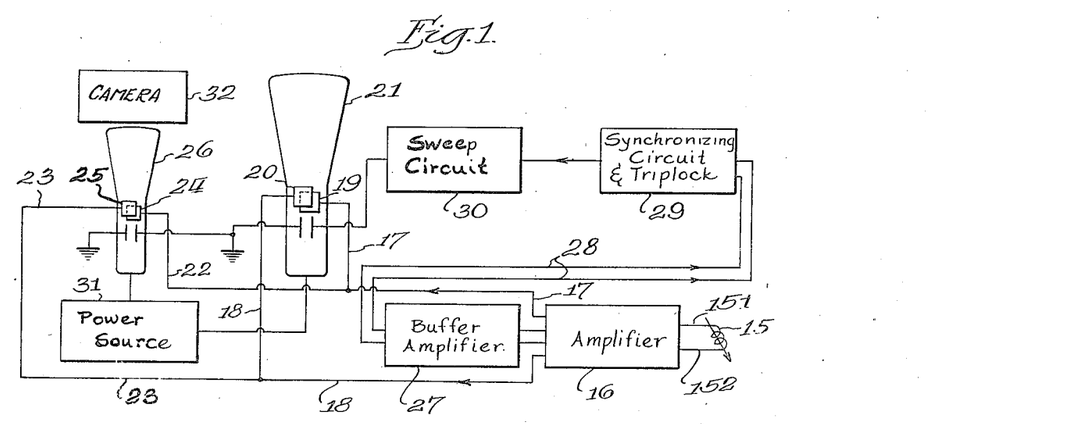
Fig. 1 is a block diagram representing a typical embodiment of the apparatus.

Referring to the attached drawings, and more particularly to Fig. 1 thereof, 15 represents an electrical pick-up device for detecting vibrations of the heart and translating them into electrical waves. The output of this pick-up device is connected to an amplifier 16 which may be of conventional design, not illustrated, such as a resistance coupled push-pull amplifier of one or more stages. The output of the amplifier is connected by means of conductors 17 and 18 to the deflecting plates 19 and 20 of the cathode ray tube 21. The output of amplifier 16 is also connected by means of conductors 22 and 23 to the deflecting plates 24 and 25 of cathode ray tube 26.

A portion of the output of amplifier stage 27, through conductors 28 is connected to the input of a synchronizing circuit and tripping lock 29. The synchronizing circuit controls the operation of a sweep circuit 30. Sweep circuit 30 governs the rate at which the ray of tube 21 is deflected in a horizontal plane and is so adjusted manually that for a single heart beat the ray will undergo a deflection from one side of the screen to the other. The purpose of the synchronizing and trip lock circuit is that, once it has started the sweep circuit, it keeps other vibrations of the cardiac cycle from influencing the tripping circuit until one cardiac cycle is over and the next cycle is ready to begin. Anode, cathode and focusing electrode voltages are supplied by means of a power source 31 which may be of conventional design. A camera 32 is provided, having suitable means such as photographic film or sensitized paper for recording the vibrations occurring on the screen of cathode ray tube 26.

Figure 2:
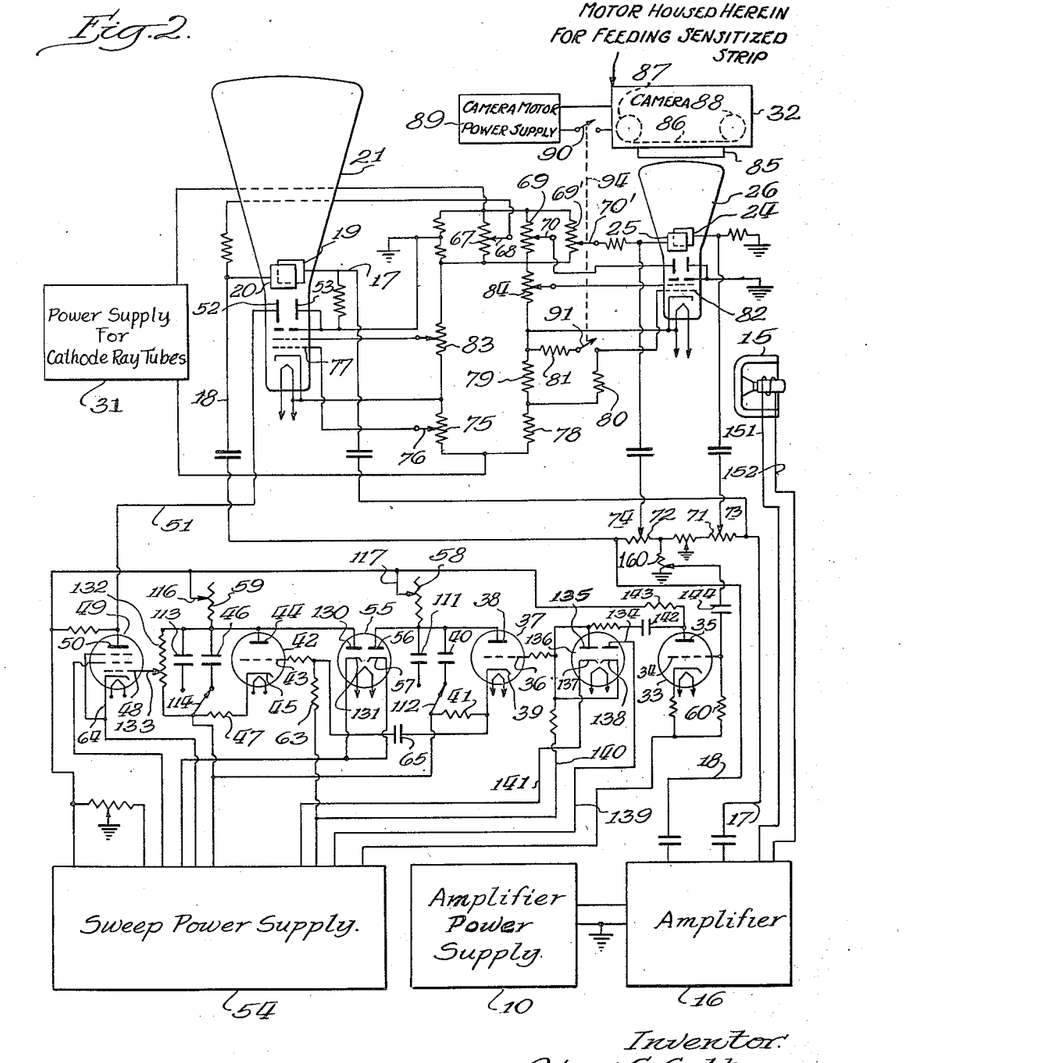
Fig. 2 is a more detailed schematic diagram.

The circuits represented in the block diagram of Fig. 1 are shown in detail in Fig. 2 wherein electrical pick-up device 15 is connected to any conventional amplifier 16, the output of which is connected through conductors 17 and 18 to the deflecting plates 19 and 20 of cathode ray tube 21. Any suitable power supply, indicated generally at 10, may be supplied for amplifier 16. Across a portion of the output of amplifier 16, a vacuum tube 33, having a control grid 34 and a plate 35, is connected, through a variable resistor 160. The grid return of tube 33 is connected to ground through the voltage divider of the sweep power supply 54. Thus, since the voltage divider of the amplifier power supply 1 is grounded, the input circuit of tube 33 is completed.

A portion of the output of tube 33 is connected through the anode 35 and condenser 142 with the input of grid 36 of a gaseous discharge tube 37 which is preferably a trigger tube such as the 885 gas triode type. (See "The Radio Ama teur Hand Book," 1938 edition, Table VII, p. 77.) Across the input of tube 37 is connected a limit tube 136 with anode 135 and cathode 137, so biased that when the potential on grid 36 of tube 37 rises to a predetermined value, plate 135 and cathode 137 become conducting, thus limiting the potential in the positive direction to which grid 36 of tube 37 may rise, due to the changing output of tube 33.

Anode 135 and cathode 137 of tube 136 are connected to the grid 36 of tube 37 and the plate 134 is so biased that the potential on grid 36 of tube 37 is limited to a predetermined value in the negative direction when the output of tube 33 changes in that direction. Thus, the output of tube 33 may change any amount, yet its full amplification is realized during the first portion of its change. However, when the voltage on the grid 36 of tube 37 rises or falls a predetermined amount, it is held there during the remaining interval of that half cycle by tube 136, thus limiting the potential applied to the input of tube 37.

Bias of cathode 137 and plate 134 of tube 136 is accomplished by connecting them respectively above and below the potential to which grid 36 of tube 37 is permanently connected. The same approximate result of limiting the output of tube 33 may be accomplished by driving the grid of tube 33 far beyond the straight portions of its characteristic curve in both directions, thus limiting its output by saturation and cutoff of tube 33. However, the fine adjustment which is possible by introducing tube 136 into the circuit is hard to maintain by overdriving tube 33 due to the variations of individual tube characteristics. Therefore, as better results were obtained when tube 136 was used purely from a stability standpoint, we prefer this arrangement.

Across anode 38 and cathode 39 of tube 37 there is placed a condenser 40 in series with a resistor 41. Condenser 40 and resistor 58 constitute a charging circuit, the time constant of which is dependent upon the capacity of condenser 40 and the value of resistor 58. A second gaseous discharge tube of the trigger type is shown at 42 as having a control grid 43 and cathode 45. Across anode 44 and cathode 45 of tube 42 there are placed a condenser 46 and resistor 47. Condenser 46 and resistor 59 form a charging circuit the time constant of which depends on the capacity of condenser 46 and the value of resistor 59. The voltage across resistor 41, when tube 37 is conducting, is impressed through condenser 65 on to the input of control grid 43 of tube 42. Thus, when trigger tube 37 starts to conduct, trigger tube 42 also starts to conduct.

Across condenser 46 is connected a resistor 132 which, by means of adjustable arm 133, permits a portion of the voltage across condenser 46 to be impressed on the input of control grid 43 of tube 49. Tube 49 is an amplifier tube with plate 50 and cathode 64. The output of tube 49 is connected through conductor 51 to deflecting plate 52, one of the pair of deflecting plates 52 and 53 of tube 21. Deflecting plate 53 of tube 21 is connected to the cathode of tube 49 through ground and the voltage divider of the power supply 54. Deflecting plates 52 and 53 of tube 21 are the second pair of deflecting plates of tube 21.

Any suitable power supply designated generally at 54 is provided for the anodes of tubes 33, 136, 37, 55, 42 and 49.

In order to limit the voltage across condenser 40 a rectifier such as diode tube 55 having anode 56 and cathode 57 is connected in series with resistor 58 across power supply 54 and in parallel with the anode 38 of discharge tube 37. In order to limit the voltage across condenser 46, anode 130 and cathode 131 of tube 55 are connected in series with resistor 59 across power supply 54 and in parallel with anode 44 of discharge tube 42.

The cathodes 57 and 131 of tube 55 are biased so that when condenser 40 or condenser 46 is charged or when anode 37 of tube 36 or anode 44 of tube 42 reaches a predetermined positive potential, the anode 56 and cathode 57 of tube 55 or the anode 130 and cathode 131 of tube 55 become conducting, thereby limiting the potential to which condenser 40 and condenser 46 can be charged, respectively, limiting in turn the positive potential on anode 38 of tube 37 and anode 44 of tube 42. Variable resistor 58 is provided to vary the rate of charge of condenser 40 and variable resistor 59 is provided to vary the rate of charge of condenser 46. Grid 36 of tube 37 and grid 43 of tube 42 are biased to cut-off.

Cathode 64 of tube 49 is connected to the voltage divider in power supply 54 so that grid 48 of tube 49 is so biased that, when condenser 44 is charging, the tube 49 will be operating on that portion of its characteristic curve which will give the most linear sweep in cathode ray tube 21.

A separate power supply 31 is utilized to supply voltages to the electrodes of the cathode ray tubes 21 and 26. Resistor 67 is provided with a variable tap 68 for positioning the cathode ray beam in the center of the viewing screen of tube 21. Likewise, resistors 69 and 69' are provided with variable taps 70 and 70' for centering the cathode ray upon the viewing screen of tube 26.

For the sake of compactness, it is contemplated that cathode ray tube 26 shall have a smaller viewing screen than tube 21 and, therefore, the deflection in tube 26 will be some fraction of the deflection of the cathode ray beam in tube 21. In order to regulate the amount of this deflection, the output of amplifier 16 is provided with shunt resistors 71 and 72 and variable taps 73 and 74 to provide a ready means for placing the proper potential upon deflecting plates 24 and 25 of cathode ray tube 26. Resistor 75 is provided with a variable tap 76 for regulating the grid potential of control grid 77 of cathode ray tube 21. Resistors 78, 79, 80 and 81 are provided for regulating the bias and change of bias on the control grid 82 of cathode ray tube 26. Resistors 83 and 84 are provided for focusing, in the conventional manner, the cathode ray beams of tubes 21 and 26, respectively.

A suitable lens system, indicated generally at 85, may be provided between the viewing screen of cathode ray tube 26 and camera 32 and photographic film or sensitized paper 86, carried by reels 87 and 88, may be arranged to be moved past the lens focused on the viewing screen. A motor (not shown) which is actuated by a suitable power supply 89 and provided with a starting and stopping switch 90 will serve to feed the film past the screen. Although not shown, an opaque hood can be provided for enclosing both the camera 32 and the viewing screen of cathode ray tube 26. All light other than that of the cathode ray beam will be excluded by such a hood.

A uni-control link designated by the dashed lines 94 may be provided between switch 90 and a second switch 91 for the simultaneous regulation of grid potential of control grid 82 of cathode ray tube 26 and the stopping and starting of the film reel motor.

The circuit shown in Figs. 1 and 2 and described above operates as follows when employed to detect and visualize heart vibrations: Electrical pick-up 15 is placed on the chest of the patient whose heart is to be examined. Preferably a closed bag 146, of thin rubber or similar material (see Fig. 7), and filled with a liquid having approximately the density of the tissues (water gives good results) is interposed between the pick-up and the chest wall. Such an auxiliary pick-up serves to overcome the effect of irregularities in the chest surface and insures a better contact for the electrical pick-up and less liability for the injection of extraneous vibrations.

The vibrations detected by the pick-up 15 and translated thereby electro-magnetically into electric waves are amplified in the amplifying stage 16, and the augmented output is led to one pair of plates 19 and 20 of cathode ray tube 21 so that the vibrations will appear as deflections, in the vertical plane, of the beam projected upon the screen of the cathode ray tube 21.

A portion of the output of amplifier 16 is led to the deflecting plates 24 and 25 of cathode ray tube 26 so that the vibrations will simultaneously appear on the screen of the cathode ray tube 26 in a plane perpendicular to the movement of the film 86 of camera 32. A portion of the output of amplifier 16 is led through the tube 33 which acts as a separate amplifier, thus isolating the amplifier 16 from the synchronizing and sweep circuits and increasing the amplitude of the initial vibration to such a value as to trip tube 37, rendering it conductive before a small percentage of the total value of the output apparent across plates 19 and 20 is reached. Thus, the bias of grid 36 will be overcome when the voltage due to the vibration is still a small portion of its total amplitude, and tube 37 will be rendered conductive, discharging condenser 40, the time being limited by resistor 41 which is very small in value, and which limits current through tube 37; the resistance of tube 37 plus resistor 41 and the condenser 40 will have a definite time rate of discharge.

The discharge of condenser 40 being completed, tube 37 becomes non-conductive again and the condenser 40 begins to charge. This all happens during a very small percentage of the first quarter cycle at the beginning of a heart beat. When tube 37 becomes conductive there is a voltage across resistor 41, which is impressed on the grid 43 of discharge tube 42. This voltage overcomes the bias of tube 42, which thereupon becomes conductive, discharging condenser 46. The time rate of discharge of this condenser 46 is dependent on the resistance of tube 42 plus resistor 47 and the capacity of condenser 46. Resistor 47 is very small in value, which limits the current through tube 42.

Upon discharge of condenser 46, the tube 42 becomes non-conductive and condenser 46 begins to charge. When condenser 46 discharges, the voltage across resistor 132 decreases; therefore the voltage at the variable tap 133 decreases. This causes the control grid 48 of tube 49 to become more negative with respect to cathode 64. As condenser 46 charges through power supply 54 and resistor 59, the control grid 48 of tube 49 becomes less negative, the potential being changed by the potential change at tap 133 of resistor 132.

During this interval of discharge and recharge of condenser 46, the cathode ray beam under the influence of the voltage across plates 52 and 53 will sweep horizontally from one side of the viewing screen to the other and in so doing will spread the amplified vibrations across the viewing screen. When the potential across condenser 46 reaches a predetermined value, plate 130 and cathode 131 of tube 55 become conductive, preventing condenser 46 from charging any further. Meanwhile, after discharge, condenser 40 begins to recharge through power supply 54 and resistor 58.

Since tube 37 is of the trigger type (that is, the grid only exercises control when the tube is non-conductive, the grid having virtually no control when the tube is conductive) the tube will not become conductive again during the charging of condenser 40, assuming the grid were held at a fixed negative bias value with respect to the potential across the anode 38 and cathode 39.

Since there may be vibrations taking place during a great percentage of the cardiac cycle, voltages would be impressed on grid 36 of tube 37 which might reach a value sufficient to again trip tube 37 rendering it conductive before completion of the cardiac cycle. However, tube 136 is so biased that, regardless of the value of the potential output of tube 33, the potential applied to the grid of tube 37 will be limited to a very small amount in the positive or negative direction since the bias on tube 136 is such as to render it conductive when this predetermined small positive or negative potential is reached. Thus tube 37 is prevented from being tripped until near the very end of the cardiac cycle.

Resistor 58 is decreased or increased by manually adjusting tap 117 so that the charging rate of condenser 40 corresponds approximately to the cardiac cycle, condenser 40 being charged to the potential at which anode 56 and cathode 57 of tube 55 will be conductive, at which time the cardiac cycle is over and the tube 37 is ready to be tripped again at the start of the new cardiac cycle. The action of tube 136 therefore is such that the full amplification of tube 33 may be realized between very small limits, which limits are held by tube 136. Thus, the tripping of tube 37 takes place during a very small percentage of the first quarter cycle at the beginning of the cardiac cycle.

Condenser 40 and resistor 58 and condenser 46 and resistor 59 are chosen to be of such value that, within a predetermined interval, the charge on condensers 40 and 46 substantially increase directly in proportion to time; and at some point before this straight line relation between time and charging is exceeded, rectifier 55 begins to draw current, thereby preventing the voltage across condenser 40 and 46 from increasing beyond the desired limit. As indicated above cathodes 57 and 131 of rectifier 55 are normally at a positive potential so that current flow does not begin until the voltage of anode 56 or 13 rises to or slightly above the value of the potential of cathodes 57 or 130.

At the instant tube 37 becomes conductive tube 42 also becomes conductive—as mentioned above. During the discharge of condenser 4 through tube 42 (which takes place in a very short time) the cathode ray beam, due to the voltage change on deflecting plates 52 and 5 of tube 21, is moved to the left side of the tub Since the beam is practically inertialess, it move as quickly as the potential on condenser 46 drop and the instant the condenser 46 is discharge tube 42 becomes non-conductive; thereby allowing condenser 46 to start its charging cycle.

Since the cathode ray beam follows the change in potential across condenser 46, the action which takes place is this: The beam moves to the left of the cathode ray tube very quickly—in fact, so quickly it can hardly be seen. Then the beam starts to move to the right side of the screen at a definite rate substantially directly in proportion to time. The rate at which the beam moves to the right side of the screen may be changed by selecting various values of capacity for condenser 46 and various values of resistance for resistor 59. In the operation of the unit, resistor 59 is manually operated from the front of the panel by knob 116 and the selection of condenser 46 or condenser 113 is effected by switch 114. Conditions are arranged so that by the time the cathode ray beam has traveled across the screen, condenser 46 has been charged to the potential which renders anode 130 and cathode 131 of tube 55 conductive. Since tube 55 limits the final voltage of condenser 46 to just the substantially linear rate of charge portion of its curve, only that portion of the charging cycle is utilized.

It should be mentioned here that both condensers 40 and 46 are prevented from charging past the point where their rate of charge with respect to time becomes other than substantially linear. It is important that this relation be maintained, particularly on condenser 46, since any other relation will prevent the cathode ray beam from being deflected horizontally at a constant rate. And for the purpose of most easily interpreting the curves shown on the cathode ray viewing screen it is deemed important that the cathode ray be deflected at a substantially constant linear rate. It is known, however, that there is some small digression from linearity even in the first portion of a condenser charging cycle. Therefore, amplifier 49 is biased to operate on its characteristic curve at a portion which will best correct for the above digression from linearity. The combination of tube 49 characteristics with the condenser charging cycle is such as to produce a linear curve with errors too small to be seen with the ordinary eye on the viewing screen.

It will be seen, therefore, that an amplified vibration will appear as a vertical deflection upon the cathode ray screen; further, that a sweep circuit is provided for spreading these vibrations across the screen at a uniform rate. The circuit including vacuum tube 42, charging condenser 46, resistors 47 and 59, and tube 49 and anode 130 and cathode 131 of tube 55 form a timing circuit whereby the vibrations can be made to appear as an electrical wave on the viewing screen. In order, however, to synchronize the beginning of the particular series of vibrations, for example, a heart beat, with the operation of the timing circuit so that the wave will remain stationary on the screen, the tripping or synchronization circuit—which includes tubes 37, condenser 40, resistors 41 and 58, anode 56 and cathode 57 of tube 55—is provided.

As has been pointed out above, when a vibration of amplitude sufficient to cause tube 37 to discharge condenser 40 has been detected, the operation of the sweep circuit is initiated. In order to prevent vibrations occurring within the interval of a complete sweep of the cathode ray from affecting the operation of the sweep circuit, the charging condenser 40 and its associated resistor 58 have been provided. It is characteristic of the gaseous discharge type of tube that a grid potential can initiate complete discharge or ionization thereof only when the voltage between the anode and cathode has reached a definite value for a given value of grid bias.

Condenser 40 is chosen to be of such capacity that during the length of the complete sweep, the voltage across its plate will be at no time high enough to allow grid 36 to control the discharge of tube 37, since tube 136 keeps the impressed grid voltage limited. In other words, the anode-cathode voltage of tube 37 is maintained below its critical discharge value by means of the time constant condenser 40 and resistor 58, and any vibrations impressed upon grid 36 cannot cause ionization of the tube, because tube 136 keeps the impressed grid voltage below the critical value and, therefore, these vibrations cannot be transmitted to grid 43 of tube 42 to interfere with the sweep of the cathode ray beam. This novel feature is extremely valuable where series of vibrations, such as those occurring in a complete cardiac cycle, are swept; since at any time during the cycle, vibrations of dissimilar amplitudes and various frequencies may occur.

By the use of the additional amplifying tube 33, there is provided a means for causing initiation of the sweep circuit at a point of amplitude of vibration in advance of that possible by the use of only a single amplifier such as that shown generally at 16. For example, if pick-up 15 detects a vibration, such as the initial vibration of a heart beat, then the cathode ray deflecting plates 19 and 20 show this vibration as a vertical deflection. But, as the grids of tubes 37 and 42 are normally biased at an appreciable negative value, the sweep circuit could not be put into operation until the amplified output had perhaps reached a considerable percentage of the total amplitude of the vibration and a portion of the heart cycle would then be lost and would not appear on the cathode ray tube viewing screen. Amplifier 33, however, takes the initial portion of the vibration and amplifies it to a value above that sufficient to cause discharge of tube 37 at an appreciable interval before the amplified output across conductors 17 and 18 has risen to a value suitable for causing discharge of tube 37. Amplifier 33, therefore, affords a means whereby the sweep circuit can be initiated prior to the time necessary for the complete amplified output to reach a predetermined level.

Tube 33 acts as a buffer stage preventing any transient or periodic changes occurring in the circuits associated with tube 37 (or any other tubes in the sweep or synchronizing circuits) from being reflected back into amplifier 16 or the output thereof across deflecting plates 19 and 20. Such reflection might cause upon the viewing screen serious deviation from the true character of impulse picked up by the detector 15; and would make interpretation of the cardiac cycle difficult, and perhaps, in many instances, misleading.

While the visual indication of vibrations upon the viewing screen of cathode ray tube 21 will afford a ready analysis of a cycle of vibrations such as those occurring in a complete heart beat, permanent record of these vibrations can be made by the use of the camera 32, cathode ray tube 26, and the circuits associated therewith. While a patient is being observed, the physician can first form a diagnosis from the curve apmade by the use of the camera 32, cathode ray tube 21 and then, by the closing of switches 90 and 91, he can cause a similar curve to be photographed in the manner to be now described.

Upon the closing of switches 90 and 91 the high negative bias, which is applied normally to the grid 82 of cathode ray tube 26, is removed by the placing of resistor 81 in circuit with the bias resistor 80. Switches 90 and 91 are joined by means of a link indicated by dashed lines 94 which may represent any conventional means for affording uni-control thereof.

Upon the closing of switch 90, power supply 89 causes a motor (not shown) to move the film or sensitized paper 86 at a uniform rate past the viewing screen of cathode ray tube 26.

If the retentivity of the viewing screen is kept at a low value, the vertical deflections of the cathode ray beam will be clearly spread out over the complete surface of the film or sensitized paper that has been run during a complete heart cycle. As deflecting plates 24 and 25 are connected across the output of amplifier 16, deflections similar to the vertical deflections on the viewing screen of cathode ray 21 will be caused on the viewing screen of cathode ray tube 26. It is unnecessary, however, that tube 26 be of the same size as tube 21, since the photographic record need not be equal in size, but only similar to the curve appearing on viewing screen of cathode ray tube 21. Thus, by means of variable taps 73 and 74 of resistors 71 and 72, the deflections of the cathode ray in tube 26 can be made any suitable amplitude. Further, if a moving film is provided on reels 87 and 88 and if this film is made to run at a constant proportional speed, then the photographic record will be truly similar to that on the viewing screen of tube 21.

Figure 3:
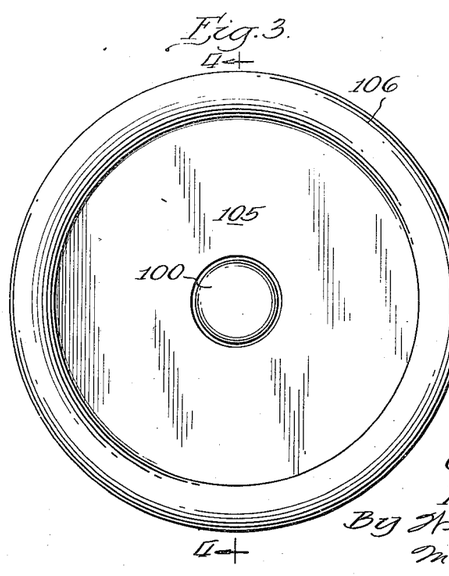
Fig. 3 is a plan view of a novel type of electrical vibration-pick-up.
Figure 4:
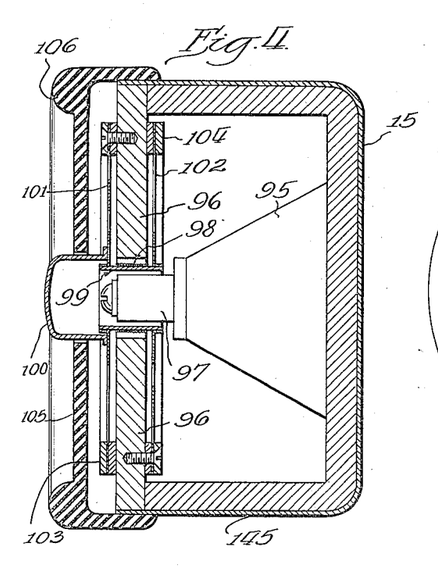
Fig. 4 is a cross-section on the line 4—4 of Fig. 3.
Figure 5:
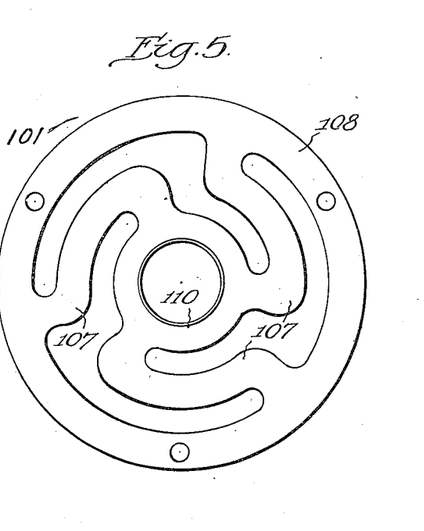
Fig. 5 is a plan view of a supporting element used in conjunction with the pick-up shown in Figs. 3 and 4.
Figure 7:
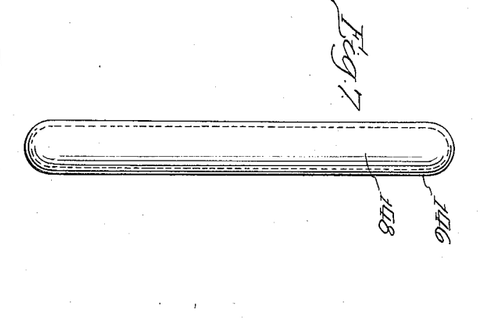
Fig. 7 is an end view of one type of auxiliary pick-up which may, under some conditions, be employed advantageously to insure faithful transmission of vibrations from the source to the electrical pick-up.

Since the vibrations to be detected comprise frequencies in the audible range, but principally those below audibility, the novel detector or pick-up shown in Figs. 3, 4 and 5 and the fluid bag shown in Fig. 7 have been devised. The pick-up is designated generally at 15 and comprises a protective casing 145 having therein a permanent magnet 95 with poles 96 and 97. Suspended in the air gap between these poles is a coil 98 carried by a cylindrical form 99 to which is attached in a suitable manner, such as by cement, a body contact button 100. This button 100 may be made of any suitable material, such as metal or artificial resins, and should be of light weight.

Button 100, coil form 99 and coil 98 are connected in any suitable manner to flexible supporting spider members 101 and 102 which are attached firmly by layers of rings 103 and 104 to the pole piece 96. Over the complete assembly, with an aperture having a slight clearance for button 100, there is placed a cover member 105 which may be of any resilient material such as rubber. Detector 15 is extremely sensitive and in order to minimize the vibrations due to skin friction an annular bead 106 is provided. This bead will form contact with the chest skin surrounding button 100 and prevent relative motion between this skin and the housing of the pick-up. Such motions might otherwise cause extraneous vibrations to be detected and transmitted to the viewing screen of cathode ray tube 21.

When using an auxiliary pick-up, such as the liquid containing bag 146, the bead 106 and button 100 are the only contacting surfaces on the surface of the bag. The use of the auxiliary pick-up is recommended in cases where the chest surface is uneven, as in the case of very thin patients. If desired, a fluid bag may be attached permanently to the pick-up by cementing bead 106 to the wall thereof. As stated before, the purpose of the auxiliary pick-up is to interpose between the electrical pick-up 15 and the chest wall of the patient (which may be an uneven surface) a medium substantially similar in density to that of the flesh of the human body.

Detector or pick-up 15 is of the electro-dynamic coil type and vibrations detected through button 100 cause coil 98 to move across the field set up in the air-gap between poles 96 and 97. The voltage generated in coil 98 is taken off by leads 151 and 152 shown in Figs. 1 and 2. Spider members 101 and 102 are made of extremely thin material and may be of metal, paper, or one of the artificial resins such as Bakelite. As shown in Fig. 5, these members have arms 107 projecting inwardly from an annular portion 108 at the outer periphery of spider members 101 and 102, and form into a central annular portion 110. The supporting arms are elongated by providing each with a portion extending over an appreciable arc and concentric with the annular portions 108 and 110. By so forming supporting arms 107 they can be made of considerably greater length than the straight radial distance between annular portions 108 and 110, and will afford greater flexibility to the entire supporting spider. Thus, the body contact member can travel for a considerable distance without substantially stretching the material of the spider member or without undue resistance to movement thereof.

Further, this construction of the spider member minimizes the pick-up of vibrations other than those desired as it presents a small area outside of the body contact member 100 upon which vibrations can impinge. Spider members 101 and 102, therefore, do not act as the diaphragms in an acoustic pick-up, but form a supporting member for holding coil 98 in the air gap and for permitting the travel of the body contact member to an appreciable distance without undue stress of the material of the spider members. Although not shown in Fig. 4, it has been found that if spider members 101 and 102 are slightly bulged in the middle, i. e., if portions 110 are separated by a greater distance than portions 108 and attached to the supporting form 99 in this disposition, the critical or natural resonance point of the whole unit can be raised so as to increase the useful range of the pick-up member 15. These spider members may be made of any suitable material. For example, an extremely satisfactory pick-up has been made in which the spider members are of flat Bakelite of .015 inch in thickness and wherein button 100 is composed of Bakelite, machined or molded, with a thickness of .005 inch.

It is known that vibrations lower than 20 cycles per second are seldom, if ever, audible to the human ear, and that in the case of many individuals vibrations of 40 or 50 cycles per second are necessary for audibility; and in the lower frequencies it is often impossible to detect the presence of plural frequencies if close together. As the instrument described records vibrations of much lower frequency than those that are audible, and as vibrations of the heart as low as 4 or 5 cycles per second have been discovered with this instrument, a diagnosis of non-audible cardiac frequencies becomes possible and, in our opinion, highly important.

As the function of the electrocardiograph is to register electrical potentials induced by muscular relaxation and contraction, it follows that lesions not involving muscular contractions, for instance, regurgitations, are not registered by said instrument, but are registered even in subaudible stages by the instrument herein described.

Furthermore, the curves appearing on the oscillograph are complex; i. e., they may be made up of several frequencies, some of which are below audibility and some higher frequencies, which are audible. The audible frequencies as heard in a stethoscope do not indicate the inaudible fundamental lower frequencies.

The instrument herein described, being sensitive to both audible and inaudible frequencies, produces visible evidence of the combination of both audible and inaudible frequencies.

It has been stated above that for the purpose of diagnosing cardiac conditions, the sweep circuit is synchronized with a particular portion of a complete heart beat, for example, the initial vibration due at least in part to the heart striking the chest wall. The capacity of condenser 40 and resistor 58 should be of such value that it will be charging at a linear rate for the duration of a complete heart beat and if the average heart beat is taken to be 72 per minute, then the time constant of the substantially linear portion of this circuit should be $\frac{1}{72}$ of a minute.

As is well known, however, the rate of heart beat varies with different individuals and for this reason resistor 58 is made variable so that synchronization of the sweep circuit with a definite range of heart beats may be effected; and an additional condenser is provided so that when connected in circuit with resistors 41 and 58 by means of switch 112, the time constant of the charging circuit will be suitable for synchronizing of the sweep circuit with any other range of heart beat rates, as will be readily understood. A condenser, indicated in Fig. 2 as 113, is provided in the sweep circuit in the event that it might be desired to have the cathode ray beam sweep at a different speed, for example, greater or less than that possible by the use of condenser 46. This feature is of value since the diagnostician may want to exhibit only a particular portion of a complete heart cycle, for example, either systole or diastole.

Figure 6:
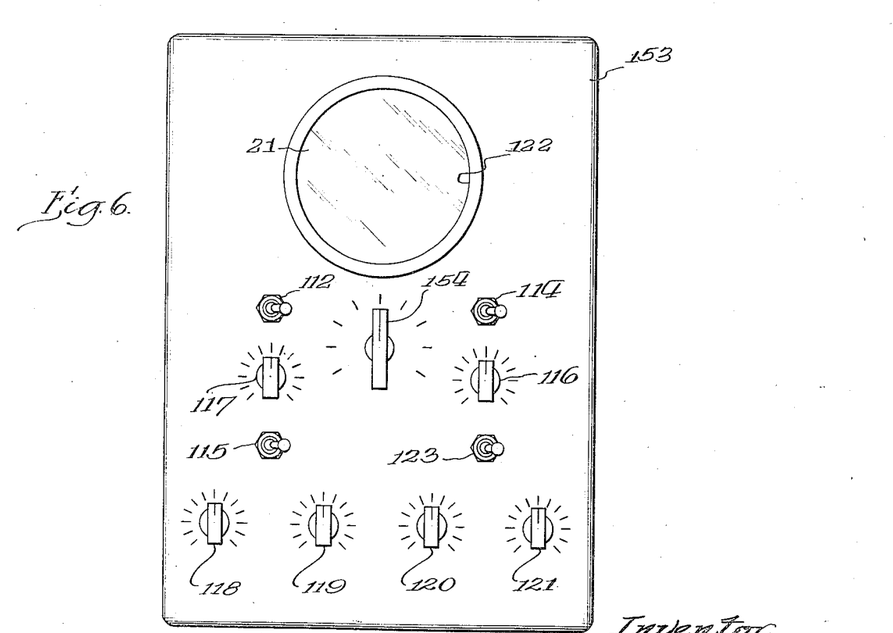
Fig. 6 is a front elevation of the panel of a cabinet or case for housing the equipment.

A front elevation of a suitable form that the instrument of the present invention may take is shown in Fig. 6. Switch 115 is provided on the panel 153 of the instrument for controlling the application and removal of power to all the circuits of the instrument that are shown in Fig. 2, and 112 designates a switch for inserting and removing condenser 40 or 111 in circuit with tube 37 of Fig. 2, and 114 designates a switch for inserting and removing condensers 46 and 113 associated in circuit with tube 42 of Fig. 2 for the reasons given above.

Dial 117 is provided for varying the value of resistor 58 of Fig. 2 in the event that it is necessary to adjust resistor 58 with either condenser 40 or 111 in the charging circuit of tube 37 in order to synchronize the sweep circuit with the heart beat of a patient under observation. Dial 116 is provided for varying the value of resistor 59 so that vernier control of the sweep circuit may be had with either condenser 46 or condenser 113 in circuit with tube 42.

The other dials shown in Fig. 6, namely, 118, 119, 120 and 121, are provided for adjusting the voltage across the vertical and across the horizontal deflection plates for centering the cathode ray beam, regulating the intensity of the cathode ray beam and for controlling the focusing of the same; and since these represent functions conventional in the ordinary cathode ray oscilloscope, it is believed unnecessary to make further references thereto. An additional knob 154 is a control handle for the gain of the amplifier 16. An aperture 122 is provided in the panel 153 through which the viewing screen of cathode ray tube 21 is visible. Cathode ray tube 26 is not shown in Fig. 6 since it is not necessary that this tube be opened to inspection and the tube, along with camera 32 and lens 85 as shown in Fig. 2, may be placed at any convenient position with respect to the remainder of the instrument. If cathode ray tube 26, the camera, etc., are to be used, then an additional switch such as 123 should be provided for controlling the closing and opening of switches 90 and 91 which are shown in Fig. 2.

While special reference has been made to the use of the present invention as an electrocardioscope, it is also useful in the detection of vibrations generally, particularly where the vibrations occur regularly or irregularly during a definite cycle of operation. For example, the present invention might be used to indicate dynamic instability in a rotating shaft. Due to its ability to indicate frequencies on the order of a few cycles a second, the instrument has proven valuable in the analysis of more complex vibrations, including both low and comparatively high frequencies.

While Figs. 1 and 2 show a circuit involving the use of two cathode ray tubes, it should be understood that either one or the other may be omitted, as desired. For example, if only a photographic record is wanted, then tube 21 and its associated circuits might be omitted. Conversely, if no photographic record is desired, then tube 21 may be retained and tube 26, camera 32 and the associated circuits may be omitted. Further, while a particular circuit including diode 55 has been described in conjunction with Fig. 2, in order to prevent excessive charge upon condenser 40, any conventional circuit arrangement such as one employing a constant current tube might be utilized.

Having thus illustrated one embodiment of our invention and explained the nature thereof, what we claim and desire to secure by United States Letters Patent is as follows:

1. An electronic cardioscope having a cathode ray tube with a viewing screen and pairs of deflecting electrodes, means for detecting heart vibrations at fundamental frequencies even below audibility and translating the same into electrical waves, means for causing the electrical waves to affect one pair of said electrodes, a sweep circuit connected to the other pair of said electrodes, means for synchronizing the operation of said sweep circuit with a predetermined impulse of a heart beat, means in circuit with the output of said electrical waves for actuating said synchronizing means before the total output of said electrical waves reaches a value sufficient to cause actuation of said synchronizing means, means to lock the synchronizing circuit so it cannot be actuated until the heart cycle is completed, a second cathode ray tube having a viewing screen and deflecting electrodes, a camera having a movable photographic film arranged before the screen of the second of said cathode ray tubes, the output of said electrical waves being connected to one pair of the deflecting electrodes of said second cathode ray tube, means for normally biasing the cathode ray of the second cathode ray tube to cut off, means for removing a portion of said bias whereby the cathode ray of said second cathode ray tube impinges upon its viewing screen and means for moving said photographic film past the screen of said second cathode ray tube at a rate proportional to the speed of said sweep circuit, said means for moving said photographic film being actuated upon the removal of a portion of the bias from the second of said cathode ray tubes.

2. Apparatus for use in the diagnosis of heart conditions, comprising means for detecting heart vibrations and translating the same into electrical waves, means for amplifying said electrical waves, a cathode ray tube having a viewing screen and having one of its pairs of deflecting electrodes connected to the output of said amplifying means and the other of its pairs of deflecting electrodes connected to a cathode ray beam sweep circuit, a second cathode ray tube equipped with a viewing screen and having one of its pair of deflecting electrodes connected in circuit with the output of said amplifying means, the other of its pairs of deflecting electrodes connected to a source of deflecting voltage, a photographic film disposed before the viewing screen of said second cathode ray tube and means for moving said photographic film across said viewing screen at a rate proportional to the time for the cathode ray beam of the first of said cathode ray tubes to sweep across the viewing screen thereof, whereby a photographic record of the cathode ray beam of said second tube may be made.

3. In an instrument for use in analyzing vibrations, employing a cathode ray tube having a viewing screen, pairs of deflecting electrodes associated with said cathode ray tube, means in circuit with one of the pairs of said deflecting electrodes for controlling the rate of deflection of a cathode ray beam, a synchronizing circuit for controlling the instant at which said cathode ray beam begins deflection, said synchronizing circuit being adjustable to control said cathode ray beam deflecting means for a predetermined interval whereby vibrations occurring during said interval will not affect said cathode ray deflecting means, means for detecting vibrations to be observed and means for translating the detected vibrations into electrical waves and amplifying the same, the output of said amplifying means being connected to the other pair of said deflecting electrodes.

4. An electronic cardioscope having a cathode ray tube, a viewing screen and pairs of deflecting electrodes, means for detecting vibrations of the heart at fundamental frequencies and translating the same into electrical waves, the output of said detected and translated vibrations being connected to one pair of said deflecting electrodes, a sweep circuit connected to the other pair of said deflecting electrodes, means for synchronizing the operation of said sweep circuit with a predetermined character of impulse of said vibrations, and means in circuit with the output of said detected vibrations for controlling the operation of said synchronizing means, whereby said synchronizing means will cause said sweep circuit to operate only after a predetermined interval, regardless of the amplitude of vibrations during said interval.

5. An instrument for use in diagnosing cardiac conditions comprising a cathode ray tube having the usual deflecting electrodes and a viewing screen, body contact means for electrically detecting vibrations of the heart and translating the same into electrical waves, means for amplifying said electrical waves, the output of said amplifying means being connected to one pair of deflecting electrodes of said cathode ray tube, means in circuit with the other pair of deflecting electrodes for regulating the rate at which the cathode ray beam sweeps across the viewing screen of said cathode ray tube, means in circuit therewith for synchronizing said sweeping rate means with the initial impulse of a heart beat, said last named means having a time constant such that said sweeping rate control will operate only on corresponding portions of successive heart beats.

6. In an electric diagnosing instrument, a body contact member for detecting heart vibrations and translating the same into electrical waves, means for amplifying said electrical waves, a cathode ray tube having two pairs of deflecting electrodes, the output of said amplifying means being connected to one pair of deflecting electrodes of said cathode ray tube, a sweep circuit connected to the other pair of said deflecting electrodes, means in circuit with the output of said amplifying means for synchronizing said sweep circuit with a heart vibration and means in circuit therewith for preventing undesired vibrations from actuating said sweep circuit.

7. Apparatus for the visual analysis of vibrations comprising means for detecting vibrations and translating them into electrical waves, means for amplifying the electrical waves, the output of said amplifying means being connected to one pair of cathode ray tube deflecting electrodes, a timed deflection circuit connected to the other pair of deflection electrodes of said cathode ray tube, a synchronizing circuit for controlling the operation of said timed deflection circuit, and means in circuit with the output of said amplifying means for actuating said synchronizing circuit before the total output of said amplifying means reaches a value sufficient to cause actuation of said synchronizing circuit.

8. A cathode ray tube oscilloscope having a means for detecting vibrations to be studied and translating the same into electrical waves, means for amplifying said electrical waves, the output of said amplifying means being connected to a pair of deflecting electrodes of the cathode ray tube, a timed deflecting circuit associated with the other deflecting electrodes of said cathode ray tube, means for synchronizing the operation of said timed deflecting circuit with the initiation of a vibration, and means for controlling the said synchronizing means whereby vibrations succeeding the initial vibrations in a fixed interval will not actuate said timed deflecting circuit.

9. A cathode ray tube oscilloscope having means for detecting vibrations and representing the same as visible waves on the viewing screen of said cathode ray tube, comprising means for varying the cathode ray in accordance with the amplitude of said vibration, means for deflecting said cathode ray at a substantially linear time rate, means for synchronizing said deflection with the initial impulse of a vibration and means in circuit with said synchronizing means for maintaining said synchronizing means inoperative for a predetermined interval after said initial impulse.

10. Vibration indicating apparatus comprising a cathode ray tube having a viewing screen and pairs of deflecting electrodes, means for detecting vibrations and translating them into electrical waves, means for amplifying said electrical waves, the output of said amplifying means being connected to one pair of deflecting electrodes, a sweep circuit associated with one other pair of said deflecting electrodes, means for synchronizing the operation of said sweep circuit with a predetermined character of vibration, and means for preventing the operation of said synchronizing means for a predetermined interval.

11. In an electrocardioscope, a body contact member for detecting heart vibrations and translating them into electrical waves, means for amplifying said vibrations, a cathode ray tube having deflecting electrodes and a viewing screen, one set of deflecting electrodes connected to the output of said amplifier, the other set of deflection electrodes connected to a sweep circuit, means for synchronizing the operation of said sweep circuit with a heart vibration, and means controlled by the output of said amplifying means for causing said synchronizing means to operate.

12. In a cathode ray oscilloscope, an axis along which the cathode ray is to be deflected in accordance with the amplitude of a wave under inspection, an axis along which the cathode ray tube is to be deflected with respect to time, means for synchronizing the second of said axes with respect to the initial impulse of the wave under inspection, and means connected to the synchronizing means for maintaining the same inoperative for subsequent impulses, regardless of amplitude, for a predetermined interval.

13. An instrument for use in diagnosing cardiac conditions of the type wherein vibrations emitted by the heart are picked up at the chest wall, a translating device converts the vibrations into corresponding electrical waves, and an amplifier amplifies the electrical waves and transmits the amplified waves to a deflecting electrode of a cathode ray tube, characterized by the fact that the translating device is of the dynamic type, and that there is provided a connection composed only of substantially inelastic material between the chest wall and the translating device whereby vibrations at the chest wall and both within and without the audible frequency range are faithfully communicated from the chest wall to the translating device.

14. An instrument for use in diagnosing cardiac conditions of the type wherein vibrations emitted by the heart are picked up at the chest wall, a translating device converts the vibrations into corresponding electrical waves, and an amplifier amplifies the electrical waves and transmits the amplified waves to a deflecting electrode of a cathode ray tube, characterized by the fact that the translating device is of the dynamic type, and that there is provided a connection composed entirely of substantially solid material interposed between the chest wall and the translating device faithfully to communicate from the chest wall to the translating device heart vibrations present at the chest wall and both within and without the audible frequency range.

15. An instrument for use in diagnosing cardiac conditions of the type wherein vibrations emitted by the heart are picked up at the chest wall, a translating device converts the vibrations into corresponding electrical waves, and an amplifier amplifies the electrical waves and transmits the amplified waves to a device for converting electrical waves into visual indications, characterized by the fact that the translating device is of the dynamic type, and that there is provided a connection composed wholly of substantially inelastic material between the chest wall and the translating device whereby vibrations at the chest wall and both within and without the audible frequency range may be faithfully communicated from the chest wall to the translating device.

OSCAR G. SALB.
RALPH E. STURM.

---

CERTIFICATE OF CORRECTION.

Patent 2,294,015.　　　　　　　　　　　　　　　　August 25, 1942.
　　　　　　　　　OSCAR G. SALB, ET AL.

It is hereby certified that error appears in the printed specification of the above numbered patent requiring correction as follows: Page 5, second column, line 75, strike out the syllable "ap-"; page 6, first column, line 1, strike out the words and comma "made by the use of the camera 32," and insert instead --appearing on the viewing screen of--; and that the said Letters Patent should be read with this correction therein that the same may conform to the record of the case in the Patent Office.

Signed and sealed this 1st day of December, A. D. 1942.

Henry Van Arsdale,
(Seal)　　　　　　　　　　　　Acting Commissioner of Patents.

CERTIFICATE OF CORRECTION.

Patent 2,294,015.  August 25, 1942.

OSCAR G. SALB, ET AL.

It is hereby certified that error appears in the printed specification of the above numbered patent requiring correction as follows: Page 5, second column, line 75, strike out the syllable "ap-"; page 6, first column, line 1, strike out the words and comma "made by the use of the camera 32," and insert instead --appearing on the viewing screen of--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.